United States Patent

[11] 3,607,979

[72] Inventor De Loss E. Winkler
Orinda, Calif.
[21] Appl. No. 770,384
[22] Filed Oct. 24, 1968
[45] Patented Sept. 21, 1971
[73] Assignee Shell Oil Company
New York, N.Y.

[54] HYDROPHILIC CHLOROSULFONATED BLOCK COPOLYMERS
8 Claims, No Drawings
[52] U.S. Cl. .................................................. 260/879,
260/878, 260/880
[51] Int. Cl. ................................................... C08f 19/04,
C08f 19/06
[50] Field of Search ........................................ 260/878,
879, 880, 94.9 H

[56] References Cited
UNITED STATES PATENTS
2,723,255 11/1955 Busse et al. .................. 260/79.3
2,834,749 5/1958 Salyer et al. .................. 260/30.6
3,135,716 6/1964 Uraneck et al. ............... 260/45.5
3,485,787 3/1969 Haefele et al. ................ 260/33.6

Primary Examiner—Joseph L. Schofer
Assistant Examiner—Richard A. Gaither
Attorneys—William H. Myers and Joseph W. Brown ABSTRACT: Block copolymers are provided which retain a high degree of elastomeric properties while at the same time exhibiting a large water absorption capacity are especially useful for water desalinization purposes. These block copolymers comprise chlorosulfonated derivatives of block polymers wherein the terminal polymer blocks are either polyvinyl arene blocks or polyvinyl cycloalkane blocks while the center blocks are hydrogenated conjugated diene blocks or alpha-olefin copolymer blocks of elastomeric character. The end blocks may also comprise alpha-olefin thermoplastic blocks. The chlorosulfonation is carried to an extent sufficient to impart a hydrophilic character to the polymers and is characterized by a sulfur content in the order of 1–10 percent by weight of the block copolymer.

HYDROPHILIC CHLOROSULFONATED BLOCK COPOLYMERS

BACKGROUND OF THE INVENTION

A large number of polymers have been studied for potential use as semipermeable membranes in water desalinization or for aqueous fluid purification. Normally these are polymers which have been converted to polar, i.e., anionic or cationic derivatives and have been physically or chemically altered still further to improve their porosity or other features to make them especially suitable for these particular end uses. For the most part, the primary problem encountered in this search for a suitable diaphragm material has been the lack of satisfactory elastomeric character which would impart shock resistance, resistance to pressure, extensibility, and other properties which would indicate not only its suitability for performing the primary function as a semipermeable membrane but also one which was physically capable of withstanding the stresses placed upon the membrane in a commercially likely situation. The imparting of a mere minimum of elasticity to a polymer by its derivatization is unsatisfactory on a practical scale if a polymer can be provided which has bona fide elastomeric properties and at the same time satisfactory properties permitting use as an osmotic type of diaphragm or membrane.

It is an object of the present invention to provide improved block copolymers. It is a particular object of the invention to provide block copolymers retaining elastomeric properties while also exhibiting a high water absorption capacity. It is a further particular object of the invention to provide materials especially suitable for use as diaphragms in water purification processes. Other objects will become apparent during the following detailed description of the invention.

STATEMENT OF THE INVENTION

Now, in accordance with the present invention, chlorosulfonated elastomeric block copolymers are provided, said copolymer prior to chlorosulfonation having the general configuration $A-B(-B-A)_{1-5}$ wherein each A is a nonelastomeric block of the group consisting of monovinyl arene polymer blocks, hydrogenation products thereof and alpha-olefin polymer blocks; and each B is an elastomeric polymer block of the group consisting of hydrogenated conjugated diene polymer blocks (including copolymer blocks), and alpha-olefin copolymer blocks; said chlorosulfonated polymer having a sulfur content between about 1 percent and 10 percent by weight. As used herein, the term "chlorosulfonated" will be understood to include the alternatives of polymers bearing not only chlorine substitution and chlorosulfonyl radicals but also chloro-substitution with chlorosulfonyl radicals which have been hydrolyzed to the free acid, converted to the amide or neutralized to form metallic salts, particularly alkali metal salts. Still in accordance with the present invention, it has been found that chlorosulfonated polymers of this particular type have an extremely high water absorption capacity while still maintaining to a remarkable degree their original elastomeric properties including tensile strength, degree of elongation, modulus of elasticity, and other properties required of a normal elastomer. Moreover, again in accordance with the present invention, these properties are attained and retained even in the absence of vulcanization which is normally required of polymers after they have been chlorosulfonated.

The block copolymers of the present invention are derived by chlorosulfonation of several basic types of block copolymers. In all of these, the general configuration may be described as having the general structure $A-B(-B-A)_{1-5}$. Normally, the subscript will comprise 1-3, of which the simplest general species will be A-B-A, the single block B being comprised of two adjacent blocks B and therefore indicated as a single continuous block. The original block copolymers prior to chlorosulfonation have elastomeric properties even though they have not been vulcanized. This is due to the peculiar physical arrangement of these types of block copolymers in that the blocks A, being thermoplastic nonelastomeric blocks, are believed to form so-called "domains" which are thermally reversible areas that set up a network physically similar to the sulfur cross-links which are chemically formed in the usual vulcanization process of ordinary rubbers.

The blocks B on the other hand, being elastomeric, and of suitable size with respect to molecular weight and with respect to proportion relative to the blocks A, impart an elastomeric character to the entire block copolymer up to the softening point thereof. The proportion of the individual blocks necessary to obtain this "self-vulcanizing" feature and at the same time an elastomeric characteristic to the entire polymer will vary depending upon the molecular weight of the individual blocks, the proportions thereof, and their specific identity. With respect to the simplest case, characterized by the general structure wherein each A is a monovinyl arene polymer or its hydrogenated counterpart, it is preferred that the blocks A have average molecular weights in the order of 8,000–50,000, preferably 12,000–30,000 while the hydrogenated conjugated diene center blocks preferably have average molecular weights in the order of 25,000–150,000, still more preferably 35,000–100,000. Moreover, it is preferred that the elastomeric center blocks comprise between about 50–90 percent by weight of the block polymer prior to chlorosulfonation. Of these preferred general types, two species which are especially useful as starting materials have the general configuration polystyrene-(hydrogenated polyisoprene)-polystyrene and polyvinylcyclohexane-(hydrogenated polyisoprene)-polyvinylcyclohexane. Suitable alpha-olefin block copolymers on the other hand may be employed in addition to or in place of the above types. A typical alpha-olefin block copolymer would comprise polypropylene-EPR-polypropylene, wherein EPR represents an elastomeric ethylene-propylene copolymer block. With respect to the alpha-olefin block copolymers, it is preferred that the blocks A have average molecular weights between about 30,000 and about 50,000 and the blocks B have average molecular weights between about 100,000 and about 300,000.

The preparation of the block copolymers which are used to form the chlorosulfonated derivatives does not form a part of the present invention. Briefly, however, they may be prepared by a variety of processes such as a solution process utilizing a lithium alkyl initiator. Under these circumstances the first stage is polymerization of a monovinyl arene to form a first monovinyl arene polymer block such as a polystyrene block, thereafter injecting a conjugated diene such as isoprene or butadiene into the system, continuing polymerization to form a conjugated diene polymer block and thereafter either coupling this intermediate two-block copolymer or injecting a second quantity of a monovinyl arene. Coupling agents may be employed to form either linear coupled materials or more preferably coupled polymers having either three or four times the molecular weight of the intermediate two-block copolymer. Suitable coupling agents for the formation of "-dimerized" block copolymers include dihaloalkanes such as dibromoethane as well as divinylarenes such as divinylbenzene. The formation of dimers or tetramers as coupled products involve the use of polyfunctional coupling agents or more preferably the use of a diester formed between a monohydric alcohol and a dicarboxylic acid. Diethyl adipate is a preferred species of the latter type and results in the formation of a coupled product which is a mixture of trimer and predominantly tetramers of the two-block intermediate block copolymer.

Subsequent to the formation of the original block copolymer, it is necessary to subject it to hydrogenation at least insofar as the conjugated diene polymer blocks are concerned. The hydrogenation of the monovinyl arene polymer blocks is not essential but is preferred. The requirement for hydrogenation is due to the sensitivity of the residual diene linkages which are apt to rupture during the chlorosulfonation step. The hydrogenation of the polyisoprene block results in what may be regarded as a highly regular ethylene-propylene rubber block. The hydrogenation of a polystyrene block on the other hand, if effected, results in a polyvinylcyclohexane block.

The chlorosulfonation of these types of polymers will take two alternative routes depending on whether or not the monovinyl arene polymer block is hydrogenated. In the event that hydrogenation is selectively conducted and only the conjugated diene polymer block is hydrogenated, chlorosulfonation appears to occur primarily on this center block, since monovinyl arene polymer blocks appears to be largely insensitive to chlorosulfonation. However, if the entire block polymer is hydrogenated then chlorosulfonation appears to occur relatively uniformly along the chain.

Block copolymers of alpha olefins may be prepared directly by the suitable use of a Ziegler catalyst system or the like with stepwise injection of the desired monomers. The end blocks A may comprise ethylene or propylene, for example, or thermoplastic ethylene-propylene copolymers. The elastomeric center blocks are formed by introducing the suitable ratios of ethylene and propylene or other alpha olefins to cause the formation of an elastomeric block B. Chlorosulfonation of such products is believed to occur reasonably uniformly along the alpha-olefin block copolymer chain.

In place of or in addition to those block polymers wherein the center block is a homopolymer of a conjugated diene, it is also possible to employ a random copolymer elastomeric center block such as may be obtained with suitable proportions of a conjugated diene and a monovinyl arene which may be referred to as a "SBR block" prepared from styrene and butadiene. Moreover, it is possible to utilize as a starting block polymer one having the structure polystyrene-polybutadiene-polystyrene, taking care to adjust the polymerization conditions such as by the presence of a small amount of an ether such as tetrahydrofuran or diethyl ether to cause a substantial amount of vinyl side chains to be formed in the elastomeric polybutadiene block B. This is highly desirable since upon hydrogenation this center block is converted to the corresponding olefin polymer and if too nearly linear will resemble polyethylene and therefore be nonelastomeric. It is, therefore, highly desirable to employ a branched center block in view of this limitation. It is also possible to prepare mixtures of these block copolymers either prior to or subsequent to hydrogenation and either prior to or subsequent to chlorosulfonation.

These types of block copolymers may be chlorosulfonated by two general methods: One involves the use of sulfur dioxide and chlorine in the presence of light or a free radical source, while the other utilizes sulfuryl chloride in the presence of light and a small amount of catalyst such as pyridine or quinoline. The first method is preferred if it is desired to introduce large amounts of chlorine with only small amounts of sulfur. The second method is best suited to give reproducible results when a minimum amount of chlorine is desired.

Essentially all of the available chlorine ends up in the polymer when sulfuryl chloride is used as the chlorosulfonating agent. The yield on sulfur varies with the conditions and catalyst. Yields are improved by controlling the temperature preferably between about 20° and 30° C., although satisfactory results are obtained at temperatures between about 20° and 60° C. Other suitable catalysts comprise diethyl amine, triethyl phosphate, amyl amine, or tributyl phosphine. Solvents preferred for the chlorosulfonation procedure include halocarbons such as carbon tetrachloride or arenes such as benzene. For the expressed purpose of forming a hydrophilic polymer capable of absorbing large proportions of water and also capable of performing a desired function as a semipermeable membrane, at least 1 percent of sulfur should be present in the final product.

While the chlorosulfonated products prepared as described above may be utilized without either vulcanization or derivatizing, it is possible to either or both vulcanize and derivatize them. For example, the chlorosulfonated polymer may be exposed to an atmosphere of ammonia or may be milled together with 4–5 parts by weight per 100 parts of polymer of an oxide such as zinc oxide or particularly magnesium oxide and then exposing to an ammonia atmosphere to form more and stronger cross-links if so desired. Furthermore, a heat treatment of about 5–60 minutes at temperatures in the order of 90°–150° C. also creates a film of a higher modulus if this is desired or required.

The chlorosulfonated block copolymers can be converted to esters such as the phenyl esters. Typically this can be done by reacting the chlorosulfonated polymer with phenol in the presence of a solvent such as benzene and a catalyst such as pyridine. Suitable reaction times are 4–48 hours at temperatures between about 20° and 75° C. This results in a 300 percent modulus which is in the order of 25–100 percent higher than the parent chlorosulfonated polymer and three times that of the parent hydrogenated polymer prior to chlorosulfonation.

Amides of the chlorosulfonated polymers may be formed by reaction with primary or secondary amines particularly aliphatic amines. These react nearly quantitatively with chlorosulfonated block copolymers, utilizing a reaction time in the order of 1–24 hours at ambient temperatures; preferably 100 percent or greater molar excess of the amine is employed.

The chlorosulfonated polymer may be hydrolyzed such as by reaction with an alkali metal base to form the corresponding alkali metal salts. Hydrolysis is preferably effected by reaction in a halocarbon or hydrocarbon solution (carbon tetrachloride) of the chlorosulfonated product, in the presence of a solubilizing alcohol such as isopropyl alcohol and a suitably small amount of a water solution of an alkali metal hydroxide such as sodium hydroxide. A film of the sodium sulfonate was extremely tough and had a high modulus. Reaction temperatures in the order of 30°–75° C. were employed.

The free acid form may be prepared by heating a solution of the chlorosulfonated polymer with water for 4–200 hours at 30°–75 C.

The chlorosulfonated products found to have especially satisfactory hydrophilic properties have sulfur contents in the order of 1–10 percent and a chlorine content between about 2 and about 40 percent by weight. More preferably, the chlorosulfonated products have sulfur contents of 2–5 percent and chlorine contents of 5–20 percent by weight. Within this general area it has been found that relatively thin films are capable of absorbing 10–100 percent by weight based on the film weight of water at least in 24 hours at ambient temperatures. Thus it is indicated that these materials are especially suitable for use in water purification, involving either food products or the desalting of brines or sea water as well as brackish water particularly in so-called membrane types of process being investigated for this purpose.

The membrane types of processes remove either salt from saline water or water from salt by passing saline water through the membrane. The processes include electrodialysis, osmionic, reversed osmosis, thermal osmosis and related processes as well as their combination. Dependent upon the specific membrane material utilized for this purpose, it is preferred that the membranes be prepared from a medium incorporating water as one of its components. Preferably under these conditions it is still further advisable to avoid complete air drying of the film prior to its use in desalinizing water so as to maintain its original high capacity in this respect. When pressure is applied against the diaphragm, best results are obtained when the pressure is applied to a concentrate brine in one or more stages starting at about 1,000 p.s.i.g. and increasing stagewise to about 2,000 p.s.i.g. The membranes may be in the form of sheets or may be shaped to any desirable alternate shapes such as in the form of tubing and the like. The surface of the membrane may be altered by superficial coatings if so desired such as coatings of quaternary or tertiary amines derivatives of polyvinyl aromatic hydrocarbons, melamine-formaldehyde resins admixed with guanidine or polyacrylic or polymethacrylic acids. Such coatings may be applied in usual manner as by first spraying and if necessary grafting or crosslinking to the surface of the chlorosulfonated block copolymer. Plasticizers may be employed for flexibilizing the membrane material and to aid in depositing a suitable membrane.

A pore-forming agent may be utilized if desired to alter the osmotic properties of the diaphragm. Plasticizers are suitable to some degree for this purpose and thus form a dual role. After serving as a plasticizer during formation of the membrane, it then may serve as a pore-former during and after washing. Thus bifunctional components as dextrose, sucrose, and other sugars as well as water soluble polyhydroxy alcohols including glycerol and polyalkylene glycols as well as their water soluble ethers and esters may be employed. The membranes normally do not require reinforcement but if desired they may be altered by deposition on or laminating with fibers or fabrics such as Dacron, polyvinyl chloride, Nylon, and the like. Suitable proportions of plasticizers are 10–50 parts per 100 parts of the chlorosulfonated polymer. The membranes are suitably thin, in the order of 0.01–3 millimeters. Of course, thicker membranes provide increased strength but suffer from decreased rate of water transmission. Thicknesses above 0.5 millimeters are ordinarily unnecessary.

The following examples illustrate the preparation and pertinent water absorption properties of chlorosulfonated products of this invention.

EXAMPLE I

A block copolymer having the structure polystyrene-polyisoprene-polystyrene wherein the block molecular weights were 15,000–75,000–15,000 was substantially completely hydrogenated and chlorosulfonated under the following conditions:

A solution of 25 grams of the hydrogenated block copolymer in 925 grams of $CCl_4$ was purged with $N_2$ at 60° for 15 minutes, cooled to 20°. Then there was added 0.2 ml. of pyridine and 10 ml. of sulfuryl chloride. Chlorosulfonation occurred at 20–30° C. with the aid of ultraviolet light from a 275 watt sun lamp. After 1 hour the light was turned off and acid gases were purged from the system with $N_2$ at 50°. The polymer was then coagulated in IPA and dried.

The following table shows the water absorption capacity of these materials in film 10–20 mils in thickness in water at room temperature:

| | Sulfur Weight % | Water Absorption in 24 hours, % by weight of polymer |
|---|---|---|
| Sodium Salt | 5.9 | 77 |
| Free Acid | 5.9 | 29 |
| Diethyl Amide | 2.6 | 2 |
| Diethyl Amide | 4.4 | 12 |
| Diethyl Amide | 5.9 | 10 |

From the above data it will be seen that if the sulfur content (which is a measure of the sulfonyl radicals present) is too low, then the polymer has poor water absorption capacities. However, this will vary with the specific derivative employed for this purpose. Thus the alkali metal salts are especially useful due to their high water absorption capacity.

The suitability of these polymers for water purification diaphragms is indicated by the following data, which show that the physical properties are retained or even enhance by the presence of absorbed water:

Properties of the acid, sodium salt, and diethyl amide prepared from chlorosulfonated polymer.

| | | Dry | Wet (31 phr. water) |
|---|---|---|---|
| Acid: 5.9%w S 20.3%w Cl | Tensile Strength at Break, p.s.i. | 3,380 | 3,430 |
| | 300% Modulus, p.s.i. | 2,530 | 2,540 |
| | Elongation at Break, % | 340 | 370 |
| | Set at Break, % | 100 | 65 |

| | | Dry | Wet (44 phr. water) |
|---|---|---|---|
| Sodium Salt: 4.0%w S 13.1%w Cl | Tensile Strength at Break, p.s.i. | 4,900 | 2,800 |
| | 300% Modulus, p.s.i. | 1,600 | |
| | Elongation at Break, % | 610 | |
| | Set at Break, % | 100 | 40 |

| | | Dry | Wet (8 phr. water) |
|---|---|---|---|
| Diethyl Amide: 5.9%w S 20.3%w Cl | Tensile Strength at Break, p.s.i. | 4,200 | 4,920 |
| | 300% Modulus, p.s.i. | 2,100 | 2,000 |
| | Elongation at Break, % | 390 | 420 |
| | Set at Break, % | 90 | 80 |

I claim as my invention:

1. A chlorosulfonated elastomeric block copolymer, said copolymer prior to chlorosulfonation having the general configuration $A-B(-B-A)_{1-5}$ wherein each A is a nonelastomeric block of the group consisting of monovinyl arene polymer blocks, hydrogenation products thereof, and alpha-olefin polymer blocks; and each B is an elastomeric polymer block of the group consisting of hydrogenated conjugated diene polymer blocks, and alpha-olefin copolymer blocks; said chlorosulfonated polymer having a sulfur content between about 1 percent and 10 percent by weight, blocks A having average molecular weight of 8,000–50,000, blocks B having average molecular weight of 25,000 to 150,000, the blocks B comprising 50–90 percent of the total precursor polymer, said chlorosulfonated block copolymer having been obtained by the process of subjecting the precursor block copolymer $A-B(-B-A)_{1-5}$ to chlorosulfonation with an agent of the group consisting of sulfur dioxide-chlorine mixtures and sulfuryl chloride, both in the presence of a free radical catalyst at temperatures between about 20° C. and 60° C.

2. A chlorosulfonated polymer according to claim 1 wherein the blocks A are polystyrene blocks and the blocks B are hydrogenated polyisoprene blocks.

3. A chlorosulfonated polymer according to claim 1 wherein the sulfonic acid radicals are esterified.

4. A chlorosulfonated polymer according to claim 1 wherein the sulfonic acid radicals are amidized.

5. A chlorosulfonated polymer according to claim 1 wherein the sulfonic acid radicals are alkali metal salts.

6. A chlorosulfonated polymer according to claim 1 wherein the polymer prior to chlorosulfonation has the general configuration polystyrene-(hydrogenated polyisoprene)-polystyrene, the chlorosulfonated polymer contains about 2—5% sulfur, and 4–25% chlorine and the sulfonic acid radicals are neutralized with sodium ions, the polystyrene blocks have molecular weights between about 10,000 and 25,000 and the hydrogenated polyisoprene blocks have molecular weights between about 50,000 and 100,000.

7. A membrane comprising as an essential polymeric component a chlorosulfonated polymer according to claim 4.

8. A membrane comprising as an essential polymeric component a chlorosulfonated polymer according to claim 5.